(12) United States Patent
Jackson et al.

(10) Patent No.: US 10,180,206 B2
(45) Date of Patent: Jan. 15, 2019

(54) PIPE ARRANGEMENT WITH SUPPORT SECTIONS ON THE OUTER PIPE

(71) Applicant: MTU Aero Engines AG, Munich (DE)

(72) Inventors: Hugh Alun John Jackson, Karlsfeld (DE); Willem Bokhorst, Hebertshausen (DE); Manfred Michl, Gernlinden (DE)

(73) Assignee: MTU Aero Engines AG, Munich (DE)

( * ) Notice: Subject to any disclaimer, the term of this patent is extended or adjusted under 35 U.S.C. 154(b) by 0 days.

(21) Appl. No.: 15/618,462

(22) Filed: Jun. 9, 2017

(65) Prior Publication Data

US 2017/0356590 A1   Dec. 14, 2017

(30) Foreign Application Priority Data

Jun. 13, 2016   (DE) .......................... 10 2016 210 415

(51) Int. Cl.
  *F16L 9/18*    (2006.01)
  *F16L 59/12*   (2006.01)
  *F16L 7/00*    (2006.01)

(52) U.S. Cl.
  CPC ............... *F16L 59/12* (2013.01); *F16L 7/00* (2013.01); *F16L 9/18* (2013.01)

(58) Field of Classification Search
  CPC .................................. F16L 59/12; F16L 9/18
  USPC .......................................... 138/112–114, 148
  See application file for complete search history.

(56) References Cited

U.S. PATENT DOCUMENTS

| 1,919,075 | A | * | 7/1933 | Rasmussen | E02F 3/402 |
| | | | | | 37/301 |
| 3,386,497 | A | * | 6/1968 | Feldmeier | F28D 7/026 |
| | | | | | 165/11.1 |
| 4,585,059 | A | * | 4/1986 | Lee | F28D 7/106 |
| | | | | | 138/113 |
| 5,715,587 | A | * | 2/1998 | Ziu | F16L 7/00 |
| | | | | | 138/113 |
| 5,907,134 | A | * | 5/1999 | Nording | F01N 13/08 |
| | | | | | 138/113 |
| 6,062,265 | A | * | 5/2000 | Head | E21B 17/206 |
| | | | | | 138/111 |
| 7,913,718 | B1 | * | 3/2011 | Cornwall | F16L 9/21 |
| | | | | | 138/112 |

FOREIGN PATENT DOCUMENTS

| DE | 951066 | 10/1956 |
| DE | 10028737 A1 | 10/2001 |
| DE | 102004009478 A1 | 9/2005 |
| EP | 0553936 A2 | 8/1993 |
| EP | 1431642 A1 | 6/2004 |
| WO | 0040886 A1 | 7/2000 |

\* cited by examiner

*Primary Examiner* — Patrick F Brinson
(74) *Attorney, Agent, or Firm* — Barlow, Josephs & Holmes, Ltd.

(57) ABSTRACT

The invention relates to a pipe arrangement with a fluid-carrying inner pipe and an outer pipe that surrounds the inner pipe, wherein spacers are arranged between the inner pipe and the outer pipe in such a way that a gap is formed between the inner pipe and the outer pipe, wherein the outer pipe is joined at its first axial end section in a material-bonded or cohesive manner to a first spacer, which is joined to the inner pipe in a material-bonded manner, and wherein the outer pipe is arranged at its second axial end section at least partially with a radial spacing to a second spacer, which is joined to the inner pipe in a material-bonded manner.

7 Claims, 1 Drawing Sheet

PIPE ARRANGEMENT WITH SUPPORT SECTIONS ON THE OUTER PIPE

BACKGROUND OF THE INVENTION

Figure 1:
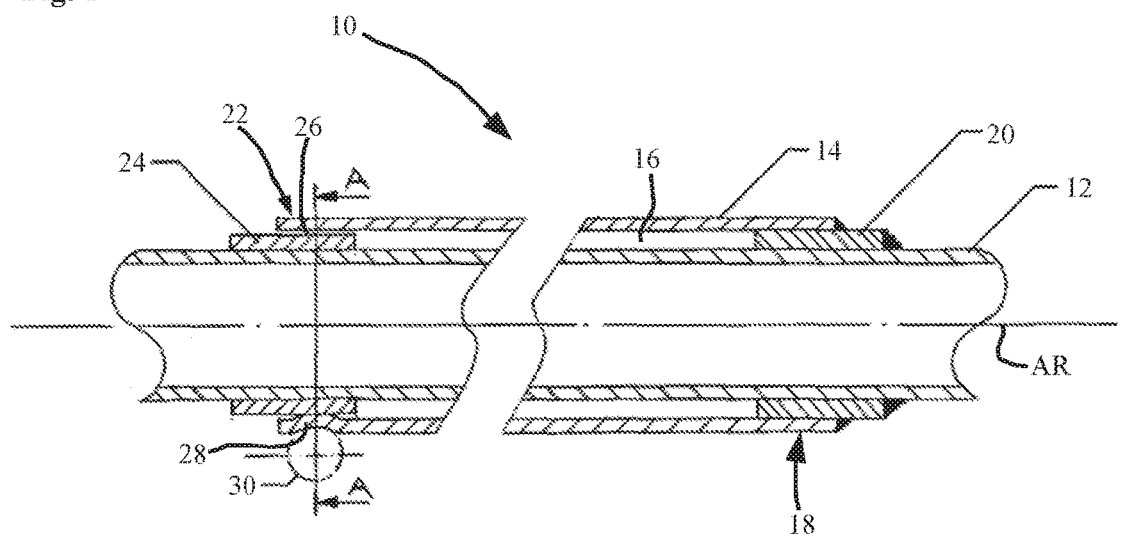

The present invention relates to a pipe arrangement with a fluid-carrying inner pipe and an outer pipe that surrounds the inner pipe, wherein spacers are arranged between the inner pipe and the outer pipe in such a way that a gap is formed between the inner pipe and the outer pipe, wherein the outer pipe is joined at its first axial end section in a material-bonded manner or cohesive manner to a first spacer, which is joined to the inner pipe in a material-bonded, and wherein the outer pipe is arranged at its second axial end section at least partially with a radial distance to a second spacer, which is joined to the inner pipe in a material-bonded manner.

Directional information, such as "axial" or "axially,", "radial" or "radially," and "peripheral," is basically to be understood as referring to the axis of the pipe arrangement, unless otherwise indicated explicitly or implicitly from the context.

For double-walled pipe arrangements, which are exposed to large thermal loads, there exists the problem that an outer pipe, which serves as a heat shield, and an inner pipe, which, for example, carries a hot fluid, such as, for instance, a coolant or an oil, must be able to move in relation to each other in order, to be able to compensate for different thermal expansions.

In the case of such pipe arrangements in the field of gas turbines, it is known not to join the second axial end section of the outer pipe to the inner pipe or to the associated spacer, so that the second axial end section is arranged around the spacer or the inner pipe in a free manner. In gas turbines, mechanical vibrations arise in operation and are transmitted to such pipe arrangements. As a result of mechanical vibrations of this kind, in particular in combination with the thermal influences that lead to a relative axial movement between the inner pipe and the outer pipe, the second end section of the outer pipe strikes or rubs against the spacer or the inner pipe. This leads to a high wear at the second end section of the outer pipe and at the spacer or at the inner pipe.

SUMMARY OF THE INVENTION

The object of the invention is to make available a pipe arrangement with which the above drawbacks can be prevented.

For achieving this object, it is proposed that the outer pipe has a plurality of support sections at its second end section, which are arranged in a distributed manner in the peripheral direction and project radially inward and which are in contact with the second spacer.

The support sections rest against the spacer over small areas or even at points. In this way, the outer pipe is stabilized in relation to the inner pipe, but with the relative movement of the inner pipe and the outer pipe still being possible in the axial direction. Vibrations that act on the pipe arrangement thus no longer lead to striking movements of the second end section of the outer pipe, so that it is possible to counteract the rapid wear.

The support sections can be formed in one piece with the second end section of the outer pipe. In this case, the support sections can be radially inward deformed regions of the outer pipe. In this way, the support sections can be produced very simply at the second end section of the outer pipe.

It is further proposed that the support sections are formed convexly radially inward. In particular, it is possible for each support section to form a kind of spherical calotte that rests with its highest point against the spacer.

In order to make possible a stable bearing of the outer pipe at the inner pipe, it is possible to provide at least three support sections at the second end section of the outer pipe, which are arranged in uniform distribution in the peripheral direction. In the case of three support sections, which are each arranged at a 120° distribution with respect to one another, it is possible to achieve an optimal support at the spacer. However, more support sections can also be provided in the case of a larger circumference.

The invention further also relates to a gas turbine, in particular to an aviation gas turbine, with at least one above-described pipe arrangement. In this case, such a pipe arrangement can be designed as a feed line or drain line of coolant, oil, or the like.

Finally, the invention relates also to a method for producing a pipe arrangement, comprising the steps:

provision of an inner pipe;
provision of an outer pipe;
provision of at least two spacers, which are arranged along the inner pipe in an axial spacing with respect to each other;
material-bonded joining of the spacer to the inner pipe;
material-bonded joining of the outer pipe at its first axial end section to one of the spacers;
deformation of the second axial end section of the outer pipe at a plurality of points along the circumference in order to produce support sections that project radially inward and are in contact with the other spacer.

The sequence of these steps is not stipulated in the scope of the present invention, but rather can also be conducted differently from above. In particular, it is possible for the deformation of the second end section of the outer pipe to occur already prior to sliding the outer pipe over the inner pipe. The support sections created by the deformation can also have spring-elastic properties in the radial direction to a certain extent on account of their form and thus exert a pre-tensioning force acting in the radial direction on the second spacer or on the inner pipe when the outer pipe is slid over the inner pipe.

In such a method, the second end section of the outer pipe can be deformed in order to create the support sections after the outer pipe has already been joined by its first end section to the one spacer or to the inner pipe in a material-bonded manner. The deformation, in particular the design of radially inward convex support sections, can occur by use of appropriate tools, such as, for instance, with a spherical pressing section that acts in the radial direction from outside on the second end section of the outer pipe.

BRIEF DESCRIPTION OF THE DRAWING FIGURES

The invention will be described below with reference to the appended figures by way of example and without any limitation.

Figure 2:
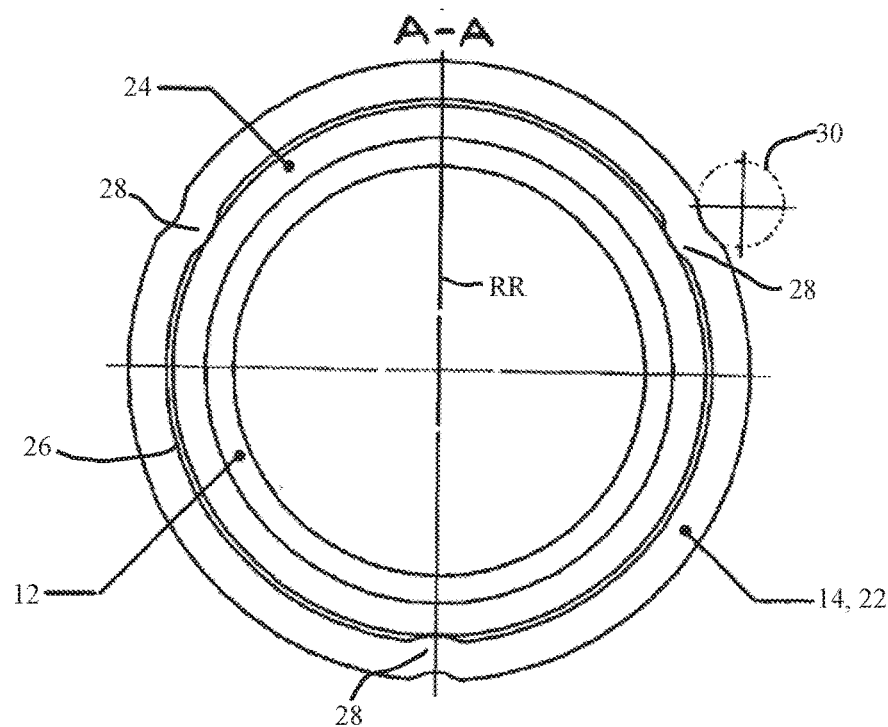

FIG. 1 shows a pipe arrangement in a longitudinal section;
FIG. 2 shows a cross-sectional illustration of the pipe arrangement corresponding to the line of cut A-A of FIG. 1.

DESCRIPTION OF THE INVENTION

A pipe arrangement 10 is illustrated in FIG. 1 in a schematic and simplified manner. The pipe arrangement 10 comprises a fluid-carrying inner pipe 12 and an outer pipe 14. The outer pipe 14 is arranged at a distance to the inner pipe 12 over the entire length, which is not illustrated here in full, so that a gap 16 is formed between the inner pipe 12 and the outer pipe 14. The outer pipe 14 has a first axial end section 18. The first axial end section 18 is joined to a first spacer 20 in a material-bonded manner and, in particular, is welded or soldered to it. The first spacer 20 is joined to the inner pipe 12 in a material-bonded manner and, in particular, is welded or soldered to it. As a result, the outer pipe 14 is fastened to and fixed in place at its first axial end section 18 at the inner pipe 12. AR indicates the axis of the pipe arrangement 10, which corresponds to the axial direction.

The outer pipe 14 has a second axial end section 22. The second axial end section 22 surrounds a second spacer 24, which is joined to the inner pipe 12 in a material-bonded manner. A gap 26 is partially formed between the second spacer 24 and the second end section 22 of the outer pipe 14 in the peripheral direction.

Furthermore, the second axial end section 22 has a plurality of support sections 28, one of which can be seen in FIG. 1 and three of which can be seen in FIG. 2. The support sections 28 project radially inward and contact the second spacer 24. In other words, the second axial end section 22 is supported at the spacer 24 or at the inner pipe 12 in the radial direction by support sections 28. In this way, any relative movement in the radial direction between the outer pipe 14 and the inner pipe 12 is counteracted or this relative movement is even prevented. Three support sections 28 are illustrated in FIG. 2. In the case of a larger circumference of the inner pipe and a correspondingly larger circumference of the outer pipe 14, however, it is also possible to provide more than three support sections 28. In order to make possible a bearing of the second axial end section 22 with as little play in the radial direction, three support sections 28 are arranged in regular distribution along the circumference. In the present example, three support sections are each arranged at an angle of 120° with respect to one another. This angle becomes correspondingly smaller when more than three support sections are provided.

Further indicated in FIG. 1 and FIG. 2 in a purely schematic manner by a dashed circle 30 is a pressing tool, with which the support sections 28 can be produced by deformation of the second axial end section 22 of the outer pipe 14. Correspondingly, radially inward, the support sections 28 have the form of a spherical segment or a spherical calotte. When the support sections 28 have a spherical design, they rest against the spacer 24 in a rather point-like manner. This point-like contact suffices for a securing in the radial direction RR, but limits only insignificantly the relative movement in the axial direction, so that the inner pipe 12 and the outer pipe 14 can move in the axial direction in relation to each other, in particular on account of thermal influences.

The following operating steps can be carried out for producing a pipe arrangement 10, wherein, according to the present invention, the sequence of the operating steps need not be absolutely as described below. First of all, an inner pipe 12 and an outer pipe 14 are supplied. At least two spacers 20, 24 are made available and are arranged along the inner pipe 12 in an axial spacing to one another. The spacers 20, 24 are joined to the inner pipe 12 in a material-bonded or cohesive manner and, in particular, welded or soldered to it. The outer pipe 14 is slid over the inner pipe 12 in the axial direction and subsequently, the first axial end section 18 of the outer pipe is joined to the first spacer 20 in a material-bonded manner and, in particular, is welded or soldered to it.

Finally, the second axial end section 22 of the outer pipe 14 is deformed at a plurality of points along the circumference in order to produce the radially inward projecting support sections 26, which are in contact with the second spacer 24. In this case, the second end section 22 is deformed by a pressing tool, which is equipped so as to create the desired form of the support section 28. In particular, however, it is also possible in the scope of the present invention for the second end section 22 of the outer pipe 14 to be already deformed prior to sliding the outer pipe 14 over the inner pipe 12. The support sections 28 created by the deformation can have spring-elastic properties in the radial direction to a certain extent on account of their form and thus can exert a pre-tensioning force acting in the radial direction on the second spacer 24 or on the inner pipe 12 when the outer pipe 14 is slid over the inner pipe 12.

What is claimed is:

1. A pipe arrangement with a fluid-carrying inner pipe and an outer pipe that surrounds the inner pipe, wherein spacers are arranged between the inner pipe and the outer pipe with a gap formed between the inner pipe and the outer pipe, wherein the outer pipe is joined at its first axial end section in a material-bonded or cohesive manner to a first spacer, which is joined to the inner pipe in a material-bonded manner, and wherein the outer pipe is arranged at its second axial end section at least partially with a radial distance to a second spacer, which is joined to the inner pipe in a material-bonded manner, wherein
    the outer pipe has a plurality of support sections at its second end section, which are arranged in a distributed manner in the peripheral direction and project radially inward and which are in contact with the second spacer, and
    the second spacer and a second axial end section of the inner pipe are configured and arranged to axially move relative to the outer pipe.

2. The pipe arrangement according to claim 1, wherein the support sections are configured in one piece with the second end section of the outer pipe.

3. The pipe arrangement according to claim 2, wherein the support sections are radially inward deformed regions of the outer pipe.

4. The pipe arrangement according to claim 1, wherein the support sections have a radially inward convex design.

5. The pipe arrangement according to claim 1, wherein at least three support sections, which are arranged in uniform distribution in the peripheral direction, are provided at the second end section of the outer pipe.

6. The pipe arrangement according to claim 1, wherein at least one pipe arrangement are employed in a gas turbine.

7. A method for producing a pipe arrangement, comprising the steps of:
    providing an inner pipe;
    providing an outer pipe;
    providing at least two spacers, which are arranged along the inner pipe in an axial spacing with respect to each other;
    material-bonded joining of the spacers to the inner pipe;
    material-bonded joining of the outer pipe at its first axial end section to one of the spacers;
    deforming of the second axial end section of the outer pipe at a plurality of points along the circumference in order to produce support sections that project radially inward and are in contact with the other spacer, wherein a second axial end section of the inner pipe, proximate to the second axial end section of the outer pipe, is configured and arranged to axially move relative to the outer pipe.

\* \* \* \* \*